United States Patent
Fukamachi (10) Patent No.: US 11,776,717 B2
(45) Date of Patent: Oct. 3, 2023

(54) CERAMIC MEMBER AND ELECTRONIC DEVICE

(71) Applicant: Murata Manufacturing Co., Ltd., Nagaokakyo (JP)

(72) Inventor: Kohei Fukamachi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 537 days.

(21) Appl. No.: 17/079,565

(22) Filed: Oct. 26, 2020

(65) Prior Publication Data

US 2021/0043341 A1 Feb. 11, 2021

Related U.S. Application Data (63) Continuation of application No. PCT/JP2019/019296, filed on May 15, 2019.

(30) Foreign Application Priority Data

Jul. 5, 2018 (JP) ................................. 2018-128134

(51) Int. Cl.
*H01C 7/04* (2006.01)
*C04B 35/01* (2006.01)
(Continued)

(52) U.S. Cl.
CPC ........... *H01C 7/043* (2013.01); *C04B 35/016* (2013.01); *C04B 35/6262* (2013.01); *C04B 35/6264* (2013.01); *C04B 35/62675* (2013.01); *C04B 35/632* (2013.01); *C04B 35/638* (2013.01); *C04B 35/64* (2013.01); *H01C 1/1413* (2013.01); *H01C 17/28* (2013.01);
(Continued)

(58) Field of Classification Search
CPC .... H01C 17/28; H01C 1/1413; C04B 35/016; C04B 35/6262; C04B 35/62675; C04B 35/632; C04B 35/638; C04B 35/64
See application file for complete search history.

(56) References Cited

U.S. PATENT DOCUMENTS 8,035,474 B2 * 10/2011 Miura .................... H01C 7/043
338/22 R
8,093,170 B2 * 1/2012 Katsu .................... H01C 7/025
252/521.1
(Continued)

FOREIGN PATENT DOCUMENTS

| CN | 102686532 A | 9/2012 |
| CN | 102211924 B | 4/2013 |

(Continued)

OTHER PUBLICATIONS

Official Communication issued in International Patent Application No. PCT/JP2019/019296, dated Jun. 11, 2019.
(Continued)

*Primary Examiner* — Kyung S Lee
(74) *Attorney, Agent, or Firm* — KEATING & BENNETT, LLP (57) ABSTRACT

A ceramic member includes a matrix phase of a perovskite compound including La, Ca, and Mn, and a heterophase including Mn and O as main components, wherein crystal grains of the perovskite compound have an average grain size of about 2.5 μm or more and about 6.4 μm or less.

20 Claims, 4 Drawing Sheets

(51) Int. Cl.
　　　*C04B 35/626* (2006.01)
　　　*C04B 35/632* (2006.01)
　　　*C04B 35/638* (2006.01)
　　　*C04B 35/64* (2006.01)
　　　*H01C 1/14* (2006.01)
　　　*H01C 17/28* (2006.01)
(52) U.S. Cl.
　　　CPC ............ *C04B 2235/3263* (2013.01); *C04B 2235/3268* (2013.01); *C04B 2235/604* (2013.01); *C04B 2235/6562* (2013.01); *C04B 2235/6565* (2013.01); *C04B 2235/6567* (2013.01); *C04B 2235/768* (2013.01); *C04B 2235/786* (2013.01)

(56) References Cited

U.S. PATENT DOCUMENTS

| 8,350,662 | B2* | 1/2013 | Abe | H01C 7/025 |
| | | | | 338/22 SD |
| 10,364,161 | B2* | 7/2019 | Hirose | C04B 35/62625 |
| 2004/0096699 | A1 | 5/2004 | Doerr et al. | |
| 2004/0105899 | A1 | 6/2004 | Dowdle et al. | |
| 2012/0268234 | A1 | 10/2012 | Mikami | |
| 2019/0077677 | A1 | 3/2019 | Tirose et al. | |
| 2020/0286654 | A1 | 9/2020 | Katsu | |

FOREIGN PATENT DOCUMENTS

| JP | 04-149023 A | 5/1992 |
| JP | 07-138069 A | 5/1995 |
| JP | 10-214674 A | 8/1998 |
| JP | 2000-138103 A | 5/2000 |
| JP | 3328204 B2 | 7/2002 |
| JP | 2002-348179 A | 12/2002 |
| JP | 2004-512931 A | 4/2004 |
| JP | 2004-526312 A | 8/2004 |
| JP | 2004-303476 A | 10/2004 |
| JP | 2009-173484 A | 8/2009 |
| WO | 2017/204118 A1 | 11/2017 |
| WO | 2019/106994 A1 | 6/2019 |

OTHER PUBLICATIONS

Official Communication issued in corresponding Chinese Patent Application No. 201980043117.9, dated May 16, 2022.
First Office Action in DE112019002421.3, dated Dec. 20, 2022, 6 pages.

* cited by examiner

CERAMIC MEMBER AND ELECTRONIC DEVICE

CROSS REFERENCE TO RELATED APPLICATIONS

This application claims the benefit of priority to Japanese Patent Application No. 2018-128134 filed on Jul. 5, 2018 and is a Continuation Application of PCT Application No. PCT/JP2019/019296 filed on May 15, 2019. The entire contents of each application are hereby incorporated herein by reference.

BACKGROUND OF THE INVENTION

1. Field of the Invention

The present invention relates to a ceramic member and an electronic device.

2. Description of the Related Art

In recent years, in electric vehicles, hybrid vehicles and the like that have become popular, many modules and motors in which a large current is handled are used. In these modules and the like, when an inrush current is generated upon power-on (or start of the motor) and an excessive inrush current flows into the module or the like, electronic components or ICs inside the module or the like may be destroyed, and this problem needs to be addressed. As a device for suppressing such an inrush current (resistive element), use of a thermistor device is under consideration.

In use of a thermistor device, the thermistor device is required to have excellent durability to inrush currents because an inrush current generated upon start of a motor of an electric vehicle reaches several hundred amperes, and the thermistor device is also required to have high reliability because the device is required to be operated at a relatively high temperature, for example, 120° C. to 250° C. Further, it is necessary that the device itself has low resistance, because if the device itself has high resistance, sufficient electric power cannot be transmitted to the motor, which causes the battery to be consumed. Therefore, it is preferable to use a material that has low resistance and in which the resistance sharply decreases at around 100° C. to 150° C. (that is, a material having a large B constant) as a thermistor material.

Conventionally, a Negative Temperature Coefficient (NTC) thermistor is known as a thermistor device for reducing the inrush current. The NTC thermistor has negative resistance-temperature characteristics. For example, an NTC thermistor including a ceramic member represented by the general formula (La, AE) $MnO_{3\pm\delta}$ (wherein AE is an alkaline earth metal such as Ba, Sr, or Ca) is known as such an NTC thermistor (for example, Japanese Patent Application Laid-Open No. 2000-138103 and Japanese Patent Application Laid-Open No. H10-214674). These NTC thermistors undergo a metal-insulator transition, and achieve lower resistance than in the case of a spinel manganese oxide at a temperature equal to or higher than the transition point (Curie temperature Tc).

In addition, such NTC thermistors are required to have further improved flexural strength in order to cope with vibration in vehicle applications and a reduction of height of electronic components.

In the meantime, the NTC thermistor includes a specific composition in order to acquire required functions depending on the desired application. In order to enhance the desired function in the NTC thermistor, usually, crystals, which are other than crystals that contribute to the desired function (a matrix phase), that is, a heterophase is reduced as much as possible to increase the density of the matrix phase, and thus the adverse effects caused by the heterophase (more specifically, for example, deterioration of functions derived from the matrix phase, which is caused by the generation of cracks and the presence of the heterophase) are reduced. In order to reduce the heterophase, for example, in the production process of the NTC thermistor, the temperature is slowly decreased at a cooling rate of around 1° C./min in a cooling process during a firing step.

However, according to a study performed by the inventor of preferred embodiments of the present invention, it was discovered that even when the ceramic member described in, for example, Japanese Patent Application Laid-Open No. 2000-138103 or Japanese Patent Application Laid-Open No. H10-214674 is applied to an NTC thermistor, sufficient flexural strength may not be obtained.

SUMMARY OF THE INVENTION

Preferred embodiments of the present invention provide ceramic members each having excellent flexural strength, and electronic devices each having excellent flexural strength.

As a result of intensive studies to solve the above-described problem, the inventor of preferred embodiments of the present invention discovered that in a ceramic member including a matrix phase of a perovskite compound including La, Ca, and Mn, the presence of a heterophase including Mn and O as main components prevents the generation of cracks that cause a decrease of flexural strength, and a combination of the presence of the heterophase and an increase of the density of crystal grains in the matrix phase increases the flexural strength compared to that in conventional NTC thermistors, and developed preferred embodiments of the present invention. More specifically, the present invention includes the following preferred embodiments.

A ceramic member according to a preferred embodiment of the present invention includes a matrix phase of a perovskite compound including La, Ca, and Mn, and a heterophase including Mn and O as main components, and crystal grains of the perovskite compound have an average grain size of about 2.5 μm or more and about 6.4 μm or less.

Further, in a ceramic member according to a preferred embodiment of the present invention, the abundance of the heterophase in a cross section of the ceramic member is about 0.1% or more and about 5.6% or less in area rate.

Further, in a ceramic member according to a preferred embodiment of the present invention, the amount of Ca is about 30 parts by mole or less, and the total amount of La and Ca is about 85 parts by mole or more and about 93 parts by mole or less based on the amount of Mn of 100 parts by mole.

An electronic device according to a preferred embodiment of the present invention includes an element body including a ceramic member according to a preferred embodiment of the present invention and including two main surfaces, and electrodes each disposed on one of the main surfaces of the element body.

Further, an electronic device according to a preferred embodiment of the present invention includes an element body including a ceramic member according to a preferred embodiment of the present invention, an external electrode disposed on an outer surface of the element body, and an internal electrode disposed inside the element body and electrically connected to the external electrode.

Further, an electronic device according to a preferred embodiment of the present invention is, for example, a thermistor device.

According to preferred embodiments of the present invention, it is possible to provide ceramic members and electronic devices each having excellent flexural strength.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, ceramic members and electronic devices according to preferred embodiments of the present invention will be described with reference to the drawings. The scope of the present invention is not limited to the preferred embodiments described herein, and various modifications can be made without departing from the spirit of the present invention. Further, when a plurality of upper limits and/or a plurality of lower limits are described for a specific parameter, it is possible to combine any of the upper limits with any of the lower limits among the upper limits and lower limits to provide a suitable numerical range.

Ceramic Member

A ceramic member according to a preferred embodiment of the present invention preferably includes a matrix phase of a perovskite compound including La, Ca, and Mn, and a heterophase including Mn and O as main components, and crystal grains of the perovskite compound preferably have an average grain size of about 2.5 µm or more and about 6.4 µm or less, for example.

Figure 1:
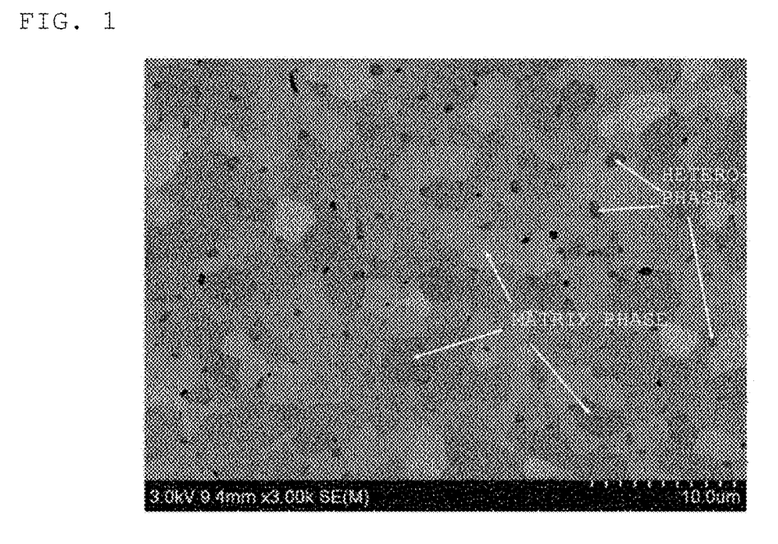
FIG. 1 is a scanning electron microscope image of a cross section (cross-sectional SEM image) of a ceramic member according to a preferred embodiment of the present invention.

The ceramic member according to the present preferred embodiment includes the matrix phase and the heterophase. The matrix phase and the heterophase of the ceramic member according to the present preferred embodiment will be described with reference to FIG. 1. FIG. 1 shows a scanning electron microscope image of a cross section (cross-sectional SEM image) of a ceramic member according to a preferred embodiment. The cross-sectional SEM image of FIG. 1 includes roughly two types of gray scale regions, that is, a region having a relatively high image density and a relatively small area (region A) and a region having a relatively low image density and a relatively large area (region B). The region A corresponds to a heterophase, and the region B corresponds to a matrix phase. In addition, the ceramic member preferably has a structure in which the heterophase is dispersed in the matrix phase.

The heterophase can be generated, for example, by adjusting (appropriately setting) the composition of the ceramic member, the firing atmosphere, and the firing profile, in particular, the cooling rate.

The matrix phase includes a perovskite compound. The perovskite compound is an aggregate of a plurality of crystal grains of a complex oxide having a perovskite structure. The perovskite compound includes La, Ca, and Mn, and may further include O (oxygen atoms). The perovskite compound is, for example, lanthanum calcium manganate. The heterophase includes Mn and O as main components, for example. The heterophase may include, for example, manganese oxide (more specifically, $Mn_3O_4$, MnO, $MnO_2$, $Mn_2O_3$ or the like). As used herein, the term "main component" means that the relevant atoms are present, based on the number of moles of all the atoms per a predetermined unit area, in an amount of about 70 mol % or more, preferably about 80 mol % or more, and more preferably about 90 mol % or more, and still more preferably about 95 mol % or more, for example. The matrix phase and the heterophase can be subjected to a quantitative analysis by a method of analyzing a cross section of the ceramic member according to wavelength dispersive X-ray spectroscopy. The composition of the entire ceramic member including the matrix phase and the heterophase can be identified by a method known in the technical field of complex oxides. Examples of the method include inductively coupled plasma atomic emission spectroscopy (ICP-AES), inductively coupled plasma mass spectrometry (ICP-MS), and an X-ray fluorescence analysis (XRF).

From the viewpoint of further increasing the flexural strength of the ceramic member, the abundance of the heterophase in a cross section of the ceramic member is, for example, about 0.1% or more, preferably about 2.5% or more, and more preferably and 3.0% or more in area rate. Alternatively, from the viewpoint of further increasing the flexural strength, the abundance of the heterophase is, for example, about 5.6% or less, and preferably about 5.4% or less in area rate. The abundance of the heterophase is the rate of the area of the heterophase based on the unit area in the cross-sectional SEM image subjected to the identification, and can be calculated by image processing of the cross-sectional SEM image subjected to the identification. The method of calculating the abundance of the heterophase will be described in detail in the EXAMPLES.

In a preferred embodiment of the present invention, crystal grains of the perovskite compound in the matrix phase preferably have an average grain size of about 2.5 µm or more and about 6.4 µm or less, for example. A ceramic member having excellent flexural strength can be obtained when the average grain size of the crystal grains is about 2.5 µm or more, because voids are less likely to be generated in the matrix phase and the ceramic member can be made dense. Further, a ceramic member having excellent flexural strength can be obtained when the average grain size of the crystal grains is about 6.4 µm or less, because minute defects in the ceramic can be reduced. From the viewpoint of further increasing the flexural strength of the ceramic member, the average grain size of the crystal grains is preferably about 3.0 µm or more, for example. From the viewpoint of further increasing the flexural strength, the average grain size of the crystal grains is preferably about 6.0 µm or less, and more preferably about 4.0 µm or less, for example. As used herein, the term "average grain size" refers to the area circle equivalent diameter (Heywood diameter). The method of calculating the average grain size will be described in detail in the EXAMPLES. The average grain size of the crystal grains can be adjusted, for example, by the mixing ratio between raw materials, the pulverization process of the calcined powder, and the firing profile.

From the viewpoint of further increasing the flexural strength of the ceramic member, the amount of Ca is, for example, about 30 parts by mole or less, and preferably about 24 parts by mole or less based on the amount of Mn of 100 parts by mole. From the viewpoint of further increasing the flexural strength, the amount of Ca is, for example, preferably about 5 parts by mole or more, and more preferably about 10 parts by mole or more. From the viewpoint of further increasing the flexural strength of the ceramic member, the total amount of La and Ca is, for example, about 85 parts by mole or more and about 93 parts by mole or less, preferably about 90 parts by mole or less, and more preferably about 87 parts by mole or less based on the amount of Mn of 100 parts by mole.

The composition of the ceramic member according to the present preferred embodiment can be adjusted by mixing predetermined amounts of raw materials including the elements.

Method for Producing Ceramic Member

The ceramic member can be produced, for example, as follows.

An example of the method for producing a ceramic member according to the present preferred embodiment includes a raw material production step of mixing and calcining raw materials to produce a ceramic raw material; a compact production step of molding the ceramic raw material to produce a compact; and a firing step of firing the compact to form a ceramic member. In the firing step, the compact is fired based on a firing temperature profile including a heating process, a high temperature holding process, and a cooling process, and in the cooling process, the temperature is preferably decreased at a cooling rate of about 10° C./min or more and about 50° C./min or less, for example.

In the raw material production step, first, a plurality of raw materials are weighed so that the amounts of Ca, La, and Mn may have a desired ratio in the ceramic member to be produced, and the ceramic materials are mixed and dried together with water and a dispersant to give a mixture. Examples of the raw materials of the ceramic member include materials including calcium and oxygen as a Ca source (more specifically, oxides, carbonates such as calcium carbonate $CaCO_3$, and hydroxides), materials including lanthanum and oxygen as a La source (more specifically, oxides such as lanthanum oxide $La_2O_3$, carbonates, and hydroxides), and materials including manganese and oxygen as a Mn source (more specifically, oxides such as manganese oxide $Mn_3O_4$, carbonates, and hydroxides). Examples of the mixing and pulverizing device include a ball mill and an attritor. The raw materials as the starting materials may be in the form of a powder or a solution.

Then, the mixture is calcined, pulverized and mixed together with water, a dispersant, an organic binder, and a plasticizer, and dried using a spray dryer to produce a ceramic raw material. The calcination temperature is preferably about 750° C. or more and about 1100° C. or less, for example. The mixture may be calcined in the air atmosphere or an oxygen atmosphere, for example. The calcination time is, for example, about 1 hour or more and about 10 hours or less, and is preferably about 2 hours or more and about 5 hours or less.

In the compact production step, the ceramic raw material (raw material powder) is filled in a mold and press-molded by a press molding method to produce a compact. Alternatively, in the compact production step, a green sheet (ceramic sheet) may be produced from a slurry by a green sheet forming method such as a doctor blade method.

The firing step may include a degreasing treatment (more specifically, a binder removal treatment or the like). The degreasing temperature is preferably about 200° C. or more and about 400° C. or less, and is more preferably about 250° C. or more and about 350° C. or less, for example. The firing temperature (maximum firing temperature Tmax) is preferably about 1000° C. or more and about 1500° C. or less, and is more preferably about 1200° C. or more and about 1350° C., for example. The degreasing treatment and the firing treatment may be performed in the air atmosphere or an oxygen atmosphere, for example.

An example of the temperature profile will be described below. In the heating process, the firing temperature is increased from room temperature (about 25° C.) to a temperature T1 (for example, about 200° C. or more and about 400° C. or less) at a constant heating rate (for example, about 1° C./min or more and about 5° C./min or less, more specifically, about 3° C./min). Then, after the temperature reaches T1, the firing temperature is held at T1 for a predetermined time (for example, about 1 hour or more and about 12 hours or less) to degrease the compact. The firing temperature is increased from T1 to the maximum firing temperature Tmax (for example, about 1000° C. or more and about 1500° C. or less) at a constant heating rate (for example, about 3° C./min to 7° C./min, more specifically, about 5° C./min). In the high temperature holding process, the firing temperature after reaching Tmax is held at Tmax for a predetermined time (for example, about 1 hour or more and about 5 hours or less). Then, in the cooling process, the firing temperature is decreased at a constant cooling rate (about 10° C./min or more and about 50° C./min or less).

The method for producing a ceramic member according to the present preferred embodiment is capable of precipitating the heterophase because the cooling rate in the cooling process is higher than the conventional cooling rate (for example, several degrees per minute, more specifically, about 1° C./min to about 3° C./min). Further, the method for producing a ceramic member according to the present preferred embodiment is advantageous in terms of cost because the time required for the cooling process can be shortened as compared with the conventional method.

The ceramic member according to the present preferred embodiment can be used as a member of an electronic device. In particular, since the ceramic member according to the present preferred embodiment exhibits NTC characteristics, the ceramic member is suitable for use as a member for a thermistor device (NTC thermistor), for example, as an element body for a thermistor device.

Electronic Device

An electronic device according to a preferred embodiment of the present invention, when used as a thermistor device, can be particularly suitably used as an NTC thermistor to reduce the inrush current, because the electronic device has excellent flexural strength, and further has basic properties of an electronic device (low resistance and excellent electrical characteristics). Examples of the NTC thermistor include a single-plate NTC thermistor and a laminated NTC thermistor.

Single-Plate NTC Thermistor

Figure 2A:
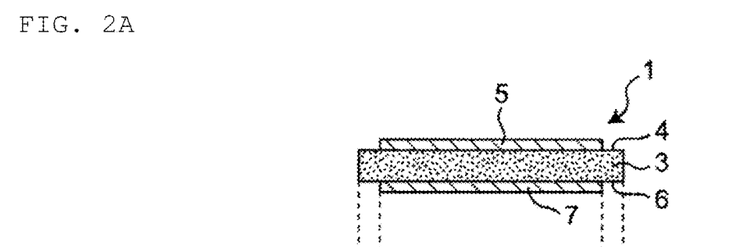
FIG. 2A is a cross-sectional view showing an example of a single-plate NTC thermistor according to a preferred embodiment of the present invention.
Figure 2B:
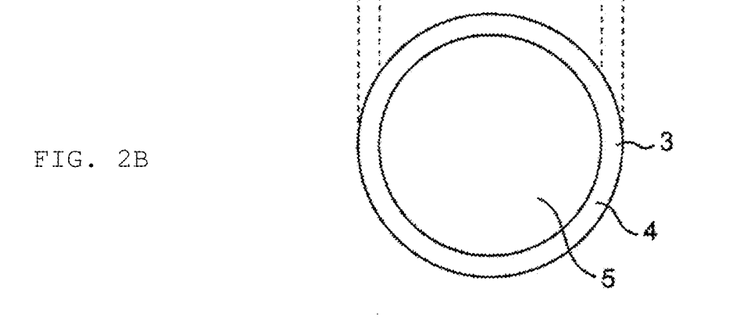
FIG. 2B is a front view showing an example of the single-plate NTC thermistor according to a preferred embodiment of the present invention.

A single-plate NTC thermistor includes an element body including the ceramic member and including two main surfaces, and electrodes each disposed on one of the main surfaces of the element body. The electrodes include at least two electrodes that sandwich at least a portion of the element body. A single-plate NTC thermistor device will be described with reference to FIGS. 2A and 2B. FIG. 2A is a cross-sectional view showing an example of a single-plate NTC thermistor according to a preferred embodiment of the present invention. FIG. 2B is a front view showing an example of the NTC thermistor according to a preferred embodiment of the present invention. A single-plate NTC thermistor device 1 includes an element body 3 including a ceramic member according to a preferred embodiment, and a first electrode 5 and a second electrode 7 disposed to face each other with the element body 3 interposed therebetween. The element body 3 includes two main surfaces (a first main surface 4 and a second main surface 6). The element body 3 has a cylindrical or substantially cylindrical shape as shown in FIGS. 2A and 2B, but the shape is not limited thereto. Examples of other shapes of the element body 3 include a rectangular or substantially rectangular plate shape. The first electrode 5 is disposed on the first main surface 4. The second electrode 7 is disposed on the second main surface 6.

The material used for the electrodes is not particularly limited, and the electrodes are made of a conductive material, preferably, for example, at least one metal material selected from the group consisting of Au, Ag, Pd, Ni, Cu, Sn, and alloys of these metals. The material may preferably be Ag, for example.

Laminated NTC Thermistor Device

Figure 3:
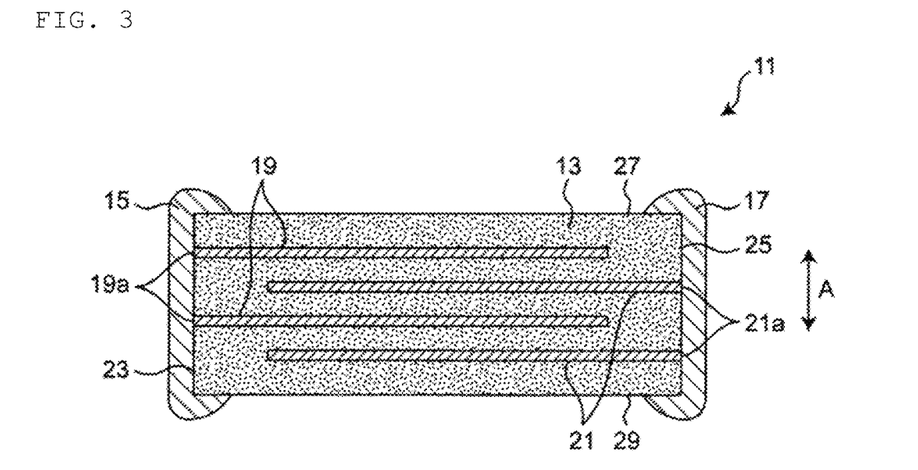
FIG. 3 is a cross-sectional view showing an example of a laminated NTC thermistor according to a preferred embodiment of the present invention.

A laminated NTC thermistor includes an element body including a ceramic member according to a preferred embodiment of the present invention, an external electrode disposed on an outer surface of the element body, and an internal electrode disposed inside the element body and electrically connected to the external electrode. A laminated NTC thermistor will be described with reference to FIG. 3. FIG. 3 is a cross-sectional view showing an example of a laminated NTC thermistor according to a preferred embodiment of the present invention. A laminated NTC thermistor device 11 includes an element body 13, a first external electrode 15 and a second external electrode 17 disposed on the outer surface of the element body 13, and first internal electrodes 19 and second internal electrodes 21 disposed inside the element body 13 and electrically connected to the first external electrode 15 and the second external electrode 17, respectively.

The element body 13 includes a ceramic member according to a preferred embodiment of the present invention. The element body 13 has, for example, a rectangular or substantially rectangular parallelepiped shape, but the shape is not limited thereto.

The first external electrode 15 is disposed on the outer surface of the element body 13. Specifically, the first external electrode 15 is disposed on a first end surface 23 of the element body 13, and is further disposed on a portion of a first side surface 27 and a portion of a second side surface 29 of the element body 13. The second external electrode 17 is disposed on the outer surface of the element body 13. Specifically, the second external electrode 17 is disposed on a second end surface 25 of the element body 13, and is further disposed on a portion of the first side surface 27 and a portion of the second side surface 29 of the element body 13. The first external electrode 15 and the second external electrode 17 are disposed so as to face each other. The first external electrode 15 and the second external electrode 17 are preferably made of, for example, Ag.

The first internal electrodes 19 and the second internal electrodes 21 are disposed inside the element body 13. Specifically, the first internal electrodes 19 and the second internal electrodes 21 are disposed parallel or substantially parallel to each other at a predetermined interval inside the element body 13. The plurality of first internal electrodes 19 and the plurality of second internal electrodes 21 are alternately disposed in the stacking direction (direction of arrow A in FIG. 3) inside the element body 13. Each of the first internal electrodes 19 and each of the second internal electrodes 21 face each other with a portion of the element body 13 interposed therebetween. The first internal electrodes 19 are electrically connected to the first external electrode 15. The second internal electrodes 21 are electrically connected to the second external electrode 17. Specifically, ends 19a of the first internal electrodes contact the first external electrode 15 so that the first internal electrodes 19 and the first external electrode 15 are electrically connected to each other. Ends 21a of the second internal electrodes contact the second external electrode 17 so that the second internal electrodes 21 and the second external electrode 17 are electrically connected to each other.

Method for Producing Electronic Device

Hereinafter, a non-limiting example of a method for producing the electronic device according to the present preferred embodiment will be described.

The non-limiting example of the method for producing the electronic device according to the present preferred embodiment includes an element body production step of producing an element body that is the ceramic member; and an electrode forming step of forming electrodes on the surface of the element body. As examples of the method for producing an electronic device, methods for producing an NTC thermistor will be described below separately for a single-plate NTC thermistor and a laminated NTC thermistor.

Method for Producing Single-Plate NTC Thermistor

The element body production step is the same or substantially the same as the above-mentioned method for producing a ceramic member. As an electrode forming method, for example, a CVD method, electrolytic plating, electroless plating, vapor deposition, sputtering, baking of a conductive paste or the like can be employed, and baking of a conductive paste is preferably used. In the baking of a conductive paste, a conductive paste is applied to the surfaces of the element body to form conductive films, and the conductive films are baked to form a pair of electrodes (external electrodes). The method of applying the conductive paste may be a known method (more specifically, screen printing or the like, for example). The conductive paste includes a conductive material (more specifically, Ag, Pd, Ag—Pd or the like, for example). The baking temperature is preferably about 500° C. or more and about 900° C. or less, for example. The conductive paste may be baked in the air atmosphere or an oxygen atmosphere, for example.

Method for Producing Laminated NTC Thermistor

As for the element body production step, green sheets are produced in the compact production step of the above-described method for producing a ceramic member, a conductive paste is applied to the green sheets by screen printing, for example, and the green sheets with the conductive paste are stacked to form a laminate.

Figure 4:
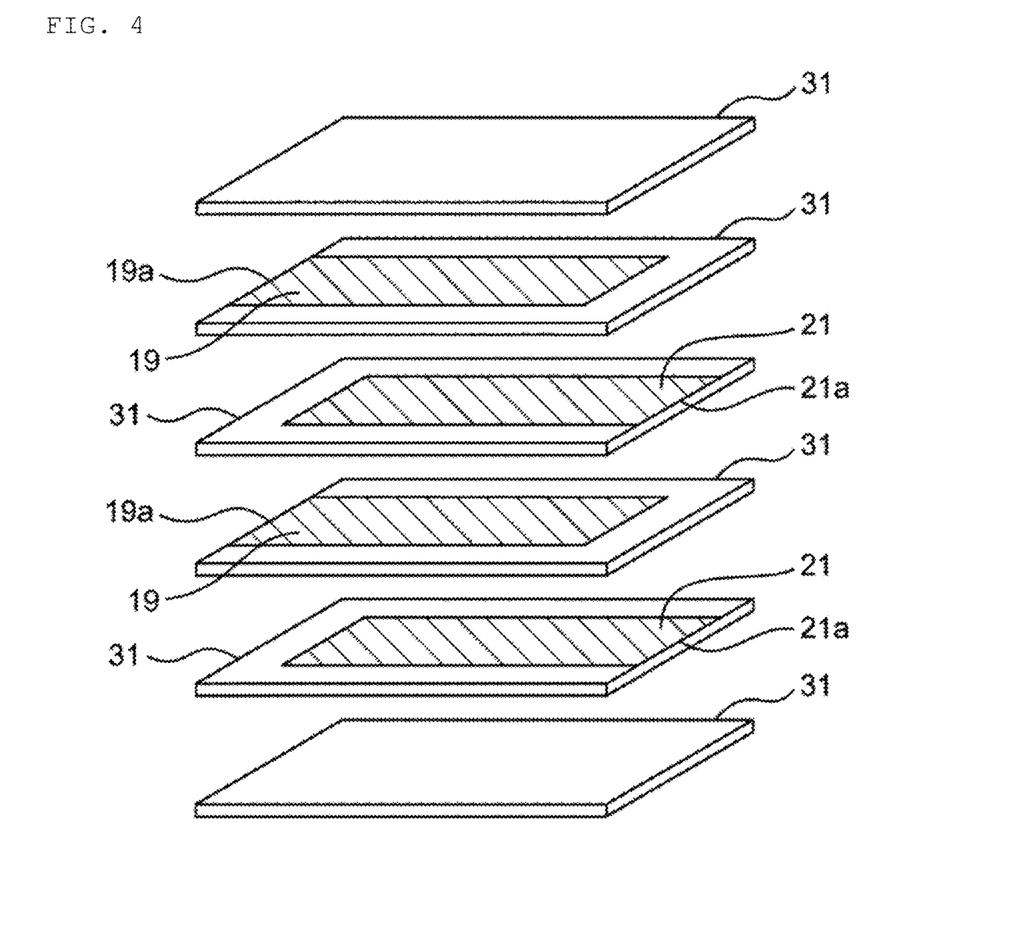
FIG. 4 is a perspective view showing a plurality of ceramic sheets of a laminate according to a preferred embodiment of the present invention.
Figure 5:
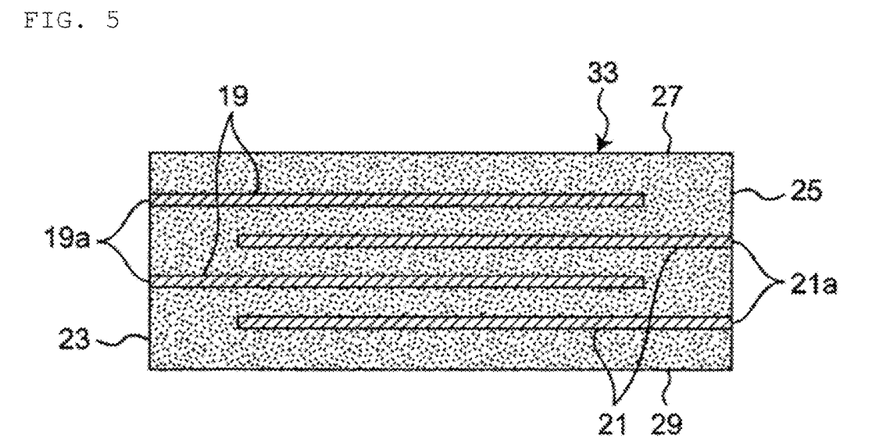
FIG. 5 is a cross-sectional view of a laminate according to a preferred embodiment of the present invention.

A laminate forming step in the element body production step will be described with reference to FIGS. 4 and 5. FIG. 4 is a perspective view showing a plurality of ceramic sheets for producing a laminate. FIG. 5 is a cross-sectional view of a laminate. In the laminate forming step, sheet-shaped compacts (ceramic sheets 31), ceramic sheets 31 each including a first internal electrode 19, and ceramic sheets 31 each including a second internal electrode 21 are prepared. As shown in FIG. 4, the ceramic sheets 31 are stacked so that the first internal electrodes 19 and the second internal electrodes 21 are alternately stacked. Further, the ceramic sheets 31 are stacked so that a plurality of ends 19a of the first internal electrodes may be disposed at a constant interval on a first end surface 23 of a laminate 33 shown in FIG. 5, and a plurality of ends 21a of the second internal electrodes may be disposed at a constant interval on a second end surface 25 of the laminate 33.

Then, the stacked ceramic sheets 31 are pressure-bonded with a press to give the laminate 33 shown in FIG. 5. The ends 19a of the first internal electrodes are exposed from the first end surface 23, and the ends 21a of the second internal electrodes are exposed from the second end surface 25. The element body 13 is obtained through the firing step of firing the laminate 33.

The electrode forming step will be described with reference to FIG. 3. In the electrode forming step, the first external electrode 15 is formed so as to cover the entire or substantially the entire first end surface 23, a portion of the first side surface 27, and a portion of the second side surface 29 of the element body 13. Further, the second external electrode 17 is formed so as to cover the entire or substantially the entire second end surface 25, a portion of the first side surface 27, and a portion of the second side surface 29 of the element body 13. The electrode forming method is the same or substantially the same as the electrode forming method in the above-mentioned method for producing a single-plate NTC thermistor.

EXAMPLES

Hereinafter, the ceramic member and the electronic device according to examples of preferred embodiments of the present invention will be described in more detail with reference to examples. However, the present invention is not limited to the scope of the examples.

1. Production of Samples

Example 1: Production of Ceramic Member and Thermistor Device of Sample No. 5

A ceramic member and an inrush current suppression device were produced by the following method.

Powders of manganese oxide ($Mn_3O_4$), calcium carbonate ($CaCO_3$), and lanthanum oxide ($La_2O_3$) each having a purity of about 99.9% or more were used as raw materials of the element body. These raw materials were weighed so that the composition of La, Ca, and Mn in the ceramic member after firing might be an amount of La of about 83 parts by mole and an amount of Ca of about 10 parts by mole based on the amount of Mn of 100 parts by mole.

These weighed raw materials were put into a ball mill together with partially stabilized zirconium oxide balls (PSZ balls), pure water, and a dispersant, sufficiently mixed and pulverized by a wet method, and dried to give a mixed powder. The obtained mixed powder was calcined at a temperature of about 850° C. to give a calcined powder. To the obtained calcined powder, PSZ balls, water, a dispersant, an organic binder, and a plasticizer were added, and the resulting mixture was pulverized and mixed to give a slurry. The obtained slurry was spray-dried to produce a raw material powder. The obtained raw material powder was filled in a mold and press-molded to give a compact. The compact had a cylindrical or substantially cylindrical shape. The size of the compact was adjusted to be about 22 mm in diameter and about 1.0 mm in thickness. The obtained compact was degreased at about 300° C. in the air atmosphere. Then, the compact was subsequently heated at about 1300° C. in the air atmosphere. The fired body was cooled at a cooling rate of about 30° C./min to give a ceramic element body (ceramic member) (Sample No. 5, Example 1). The firing temperature profile was as follows: a heating rate of about 3° C./min, a holding time of about 3 hours at a degreasing treatment temperature of about 300° C., a heating rate of about 5° C./min, a holding time of about 4 hours at a firing temperature of about 1300° C., and a cooling rate of about 30° C./min.

Then, an Ag paste was applied by screen printing to both surfaces (substantially circular surfaces) of the ceramic element body, and baked by a heat treatment at about 700° C. to form electrodes, and thereby a thermistor device (Sample No. 5, Example 1) for evaluating the inrush current was obtained.

Production of Ceramic Members and Thermistor Devices of Examples 2 to 9 and Comparative Examples 1 to 10

The ceramic members and the thermistor devices of Examples 2 to 9 and Comparative Examples 2 to 10 were produced by a method the same as or similar to that for the ceramic member and the thermistor device of Example 1 except that the composition of La and Ca in the ceramic member after firing was changed so that the amounts of La and Ca might be the amounts shown in Table 2 from the amount of La of about 83 parts by mole and the amount of Ca of about 10 parts by mole based on the amount of Mn of 100 parts by mole. The ceramic member and the thermistor device of Comparative Example 1 were produced by a method similar to that for the ceramic member and the thermistor device of Example 1 except that the above-described composition was changed to the amounts of La and Ca shown in Table 2, and the cooling rate was changed from about 30° C./min to about 1° C./min.

2. Measurement Methods

2-1. Composition and Contents of Elemental Components of Ceramic Members

An elemental analysis by inductively coupled plasma atomic emission spectroscopy (ICP-AES) was performed to identify the composition of the ceramic members, and it was determined that the ceramic members had the contents of elemental components shown in Table 2. The contents of elemental components shown in Table 2 are values calculated from the starting materials, and it was confirmed by the elemental analysis that these contents of elemental components coincide with the contents of the elemental components in the ceramic members.

2-2. Elemental Analysis, Contents of Component Elements, Identification of Component Elements, and Abundance of Heterophase Each of the ceramic members was polished to about ½ in the thickness direction to form a circular or substantially circular cross section, and thus a measurement sample was produced.

Figure 6A:
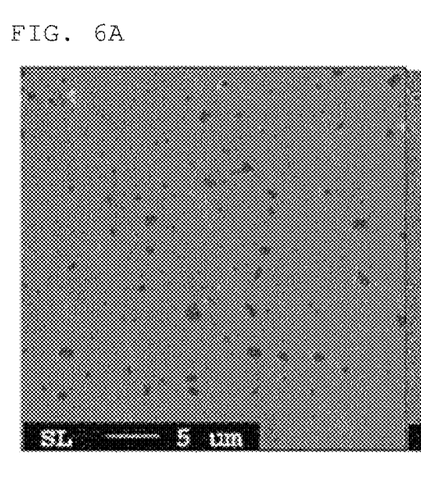
FIG. 6A is a scanning electron microscope image of a cross section of a ceramic member according to a preferred embodiment of the present invention.

Using a scanning electron microscope ("S-4800" manufactured by Hitachi High-Technologies Corporation), a SEM image of the measurement sample at the center or approximate center of the cross section of the sample was captured under the conditions of an acceleration voltage of about 3 kV and a magnification of about 3000×. The obtained SEM image is shown in FIG. 6A. FIG. 6A is a scanning electron microscope image of a cross section of a ceramic member. The SEM image of FIG. 6A includes two types of gray scale regions, that is, a region having a relatively high image density and a relatively small area (region A) and a region having a relatively low image density and a relatively large area (region B).

Figure 6B:
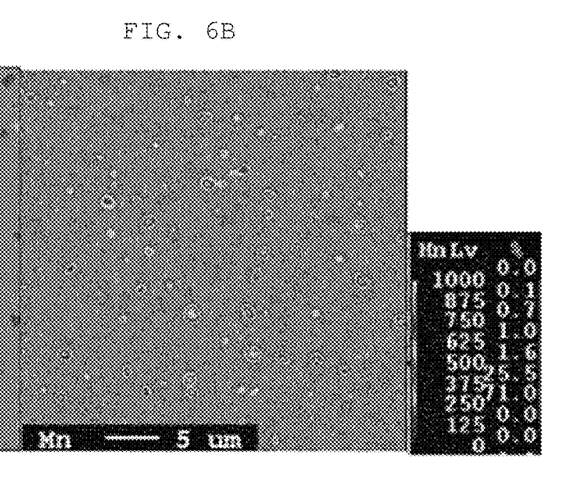
FIG. 6B is an image obtained by a mapping analysis of the SEM image of FIG. 6A.

Then, the above-described cross section was subjected to an elemental analysis by wavelength dispersive X-ray spectroscopy. An image obtained by a mapping analysis of the Mn element is shown in FIG. 6B. FIG. 6B is an image obtained by a mapping analysis of the SEM image of FIG. 6A. The image of FIG. 6B includes roughly two types of gray scale regions, that is, a region having a relatively high image density and a relatively small area (region C) and a region having a relatively low image density and a relatively large area (region D). FIG. 6B shows that the Mn element was detected in the region C. Further, since FIGS. 6A and 6B have almost the same shape, it is also shown that the regions C and D of the image of FIG. 6B correspond to the regions A and B of the SEM image of FIG. 6A, respectively. The La element, the O element, and the Ca element other than the Mn element were also subjected to such an elemental analysis. Further, an arbitrary region (about 1 μm in width× about 1 μm in length×about 1 μm to about 2 μm in depth) in the above-described cross section was subjected to a quantitative analysis of each element. The results are shown in Table 1. Table 1 shows the composition (unit: at %) of the ceramic member. In the region A, the presence of the O element, the Mn element, and the La element was observed. Further, in the region A, the total of the O element and the Mn element was about 96 at %. Therefore, it was determined that the crystal phase of the region A included the Mn element and the O element as main components, that is, the crystal phase of the region A included manganese oxide as a main component. Meanwhile, in the region B, the presence of the O element, the Ca element, the Mn element, and the La element was observed. It was determined that the crystal phase of the region B included the Ca element, the Mn element, and the La element. The cross section was analyzed using an X-ray diffractometer ("D8 Advance" manufactured by Bruker AXS), and a peak attributable to the perovskite compound in the matrix phase was observed.

TABLE 1

|  | O | Ca | Mn | La | Total |
|---|---|---|---|---|---|
| Region A | 59 | 0 | 37 | 4 | 100 |
| Region B | 63 | 2 | 19 | 17 | 100 |

An image analysis was performed using analysis software ("A-zo kun" manufactured by Asahi Kasei Engineering Corporation), and the rate of the area occupied by the heterophase (area of the region A) in the total area of the SEM image (area of the regions A and B), that is, an abundance of the heterophase was calculated. The results are shown in Table 2. In Table 2, the abundance of the heterophase of 0.0% for Sample Nos. 0 to 4, 9, and 14 indicates that no heterophase was present in the cross section of the ceramic member.

2-3. Measurement of Average Grain Size of Crystal Grains

An image analysis was performed using analysis software ("A-zo kun" manufactured by Asahi Kasei Engineering Corporation), and the average grain size of a plurality of crystal grains of the polycrystal in the SEM image obtained in the item 2-2 was measured. Specifically, the area of the crystal grains was calculated, and then the area circle equivalent diameter (diameter) of the crystal grains was calculated. The calculation was made for the entire region of the SEM image. The average of the plurality of obtained area circle equivalent diameters was defined as the average grain size of the sintered body. The results are shown in Table 2.

3. Evaluation Method

3-1. Measurement of Flexural Strength

The obtained ceramic member was cut and polished to produce a test piece (measurement sample of about 2 mm in width×about 7 mm in length×about 0.8 mm in thickness). The measurement sample was placed in a measuring device. Using a micro strength evaluation testing machine ("Micro Autograph MST-I" manufactured by Shimadzu Corporation) as the measuring device, a three-point bending test was performed with a test distance of about 3 mm. In the three-point bending test, stress was applied until the measurement sample broke, and the load when the measurement sample broke was measured.

From the measured load, the flexural strength σ was calculated using the following formula (1):

$$\sigma = (3FL/2bh^2) \tag{1}$$

wherein F represents the load (unit: N), L represents the test distance (unit: mm), b represents the width of the test piece (unit: mm), and h represents the thickness of the test piece (unit: mm).

The obtained flexural strength σ is shown in Table 2.

TABLE 2

| Sample No. | | Composition [mol] | | | | Rate of heterophase [%] | Average grain size of sintered body [μm] | Flexural strength [MPa] |
|---|---|---|---|---|---|---|---|---|
| | | La | Ca | La + Ca | Mn | | | |
| 0 | Comparative Example 1 | 83 | 10 | 93 | 100 | 0.0 | 6.8 | 94 |
| 1 | Comparative Example 2 | 87 | 10 | 97 | 100 | 0.0 | 3.2 | 102 |
| 2 | Comparative Example 3 | 73 | 24 | 97 | 100 | 0.0 | 2.5 | 107 |
| 3 | Comparative Example 4 | 67 | 30 | 97 | 100 | 0.0 | 2.2 | 103 |
| 4 | Comparative Example 5 | 90 | 3 | 93 | 100 | 0.0 | 4.1 | 88 |
| 5 | Example 1 | 83 | 10 | 93 | 100 | 0.1 | 6.4 | 120 |
| 6 | Example 2 | 69 | 24 | 93 | 100 | 0.7 | 4.5 | 139 |
| 7 | Example 3 | 63 | 30 | 93 | 100 | 2.2 | 2.7 | 131 |
| 8 | Comparative Example 6 | 57 | 36 | 93 | 100 | 2.9 | 1.4 | 85 |
| 9 | Comparative Example 7 | 86 | 3 | 89 | 100 | 0.0 | 3.8 | 98 |
| 10 | Example 4 | 79 | 10 | 89 | 100 | 2.9 | 5.5 | 147 |
| 11 | Example 5 | 65 | 24 | 89 | 100 | 3.3 | 3.9 | 155 |
| 12 | Example 6 | 59 | 30 | 89 | 100 | 3.8 | 2.5 | 142 |
| 13 | Comparative Example 8 | 53 | 36 | 89 | 100 | 4.5 | 1.2 | 80 |
| 14 | Comparative Example 9 | 82 | 3 | 85 | 100 | 0.0 | 2.9 | 98 |
| 15 | Example 7 | 75 | 10 | 85 | 100 | 4.4 | 3.8 | 167 |
| 16 | Example 8 | 61 | 24 | 85 | 100 | 5.3 | 3.2 | 177 |
| 17 | Example 9 | 55 | 30 | 85 | 100 | 5.6 | 2.6 | 142 |
| 18 | Comparative Example 10 | 49 | 36 | 85 | 100 | 5.9 | 1.1 | 80 |

The ceramic members of Sample Nos. 5 to 7, 10 to 12, and 15 to 17 (Examples 1 to 9) included a matrix phase including a perovskite compound including La, Ca, and Mn, and a heterophase including Mn and O as main components, and the average grain size of crystal grains of the perovskite compound was within the range of about 2.5 μm or more and about 6.4 μm or less.

Moreover, the ceramic members of Examples 1 to 9 had a flexural strength of about 110 MPa or more.

As for the ceramic members of Sample Nos. 0 to 4, 8 to 9, 13 to 14, and 18 (Comparative Examples 1 to 10), the ceramic members of Comparative Examples 1 to 5, 7, and 9 did not include a heterophase. In the ceramic members of Comparative Examples 1, 4, 6, 8, and 10, the average grain size was less than about 2.5 μm or more than about 6.4 μm.

Moreover, the ceramic members of Comparative Examples 1 to 10 had a flexural strength of less than about 110 MPa.

It is clear that the ceramic members of Examples 1 to 9 have a higher flexural strength than those of the ceramic members of Comparative Examples 1 to 10, and have excellent flexural strength.

The ceramic materials according to preferred embodiments of the present invention can each be used as a material for a thermistor device to reduce the inrush current, but the applications are not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic member comprising:
a matrix phase of a perovskite compound including La, Ca, and Mn; and
a heterophase including Mn and O as main components; wherein
crystal grains of the perovskite compound have an average grain size of about 2.5 μm or more and about 6.4 μm or less.

2. The ceramic member according to claim 1, wherein an abundance of the heterophase in a cross section of the ceramic member is about 0.1% or more and about 5.6% or less in area rate.

3. The ceramic member according to claim 1, wherein an amount of Ca is about 30 parts by mole or less, and a total amount of La and Ca is about 85 parts by mole or more and about 93 parts by mole or less based on an amount of Mn of 100 parts by mole.

4. An electronic device comprising:
an element body including the ceramic member according to claim 1 and including two main surfaces; and
electrodes each disposed on one of the two main surfaces of the element body.

5. An electronic device comprising:
an element body including the ceramic member according to claim 1;
an external electrode disposed on an outer surface of the element body; and
an internal electrode disposed inside the element body and electrically connected to the external electrode.

6. The electronic device according to claim 4, wherein the electronic device is a thermistor device.

7. The electronic device according to claim 4, wherein an abundance of the heterophase in a cross section of the ceramic member is about 0.1% or more and about 5.6% or less in area rate.

8. The electronic device according to claim 4, wherein an amount of Ca is about 30 parts by mole or less, and a total amount of La and Ca is about 85 parts by mole or more and about 93 parts by mole or less based on an amount of Mn of 100 parts by mole.

9. The electronic device according to claim 5, wherein the electronic device is a thermistor device.

10. The electronic device according to claim 5, wherein an abundance of the heterophase in a cross section of the ceramic member is about 0.1% or more and about 5.6% or less in area rate.

11. The electronic device according to claim 5, wherein an amount of Ca is about 30 parts by mole or less, and a total amount of La and Ca is about 85 parts by mole or more and about 93 parts by mole or less based on an amount of Mn of 100 parts by mole.

12. The ceramic member according to claim 1, wherein an abundance of the heterophase in a cross section of the ceramic member is about 2.5% or more and about 5.6% or less in area rate.

13. The ceramic member according to claim 1, wherein an abundance of the heterophase in a cross section of the ceramic member is about 3.0% or more and about 5.6% or less in area rate.

14. The ceramic member according to claim 1, wherein an abundance of the heterophase in a cross section of the ceramic member is about 2.5% or more and about 5.4% or less in area rate.

15. The electronic device according to claim 4, wherein an abundance of the heterophase in a cross section of the ceramic member is about 2.5% or more and about 5.6% or less in area rate.

16. The electronic device according to claim 4, wherein an abundance of the heterophase in a cross section of the ceramic member is about 3.0% or more and about 5.6% or less in area rate.

17. The electronic device according to claim 4, wherein an abundance of the heterophase in a cross section of the ceramic member is about 2.5% or more and about 5.4% or less in area rate.

18. The electronic device according to claim 5, wherein an abundance of the heterophase in a cross section of the ceramic member is about 2.5% or more and about 5.6% or less in area rate.

19. The electronic device according to claim 5, wherein an abundance of the heterophase in a cross section of the ceramic member is about 3.0% or more and about 5.6% or less in area rate.

20. The electronic device according to claim 5, wherein an abundance of the heterophase in a cross section of the ceramic member is about 2.5% or more and about 5.4% or less in area rate.

* * * * *